(12) United States Patent
Seki

(10) Patent No.: US 8,052,290 B2
(45) Date of Patent: Nov. 8, 2011

(54) REAR-PROJECTION-TYPE DISPLAY APPARATUS

(75) Inventor: Toshihide Seki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 288 days.

(21) Appl. No.: 12/474,539

(22) Filed: May 29, 2009

(65) Prior Publication Data

US 2010/0002321 A1 Jan. 7, 2010

(30) Foreign Application Priority Data

Jul. 1, 2008 (JP) .................. 2008-172634

(51) Int. Cl.
*G02B 5/08* (2006.01)
(52) U.S. Cl. ........................................ 359/850
(58) Field of Classification Search .......... 359/648, 359/649, 651, 726, 727, 728, 850, 851
See application file for complete search history.

(56) References Cited

U.S. PATENT DOCUMENTS 7,048,388 B2 * 5/2006 Takaura et al. .............. 353/99

FOREIGN PATENT DOCUMENTS

| JP | 2001-255462 A | 9/2001 |
| JP | 2003-207740 A | 7/2003 |
| JP | 2006-18083 A | 1/2006 |
| JP | 2006-292901 A | 10/2006 |
| JP | 2007-79524 A | 3/2007 |

* cited by examiner

*Primary Examiner* — Euncha Cherry
(74) *Attorney, Agent, or Firm* — Birch, Stewart, Kolasch & Birch, LLP

(57) ABSTRACT

A rear-projection-type display apparatus projects an image formed by a display element with a light beam emitted from a light source on a screen that is larger than the display element through a projection lens. The rear-projection-type display apparatus includes a reflective optical-element group having at least two reflecting mirrors provided between the projection lens and the screen to deflect a light from the projection lens.

5 Claims, 3 Drawing Sheets

REAR-PROJECTION-TYPE DISPLAY APPARATUS

BACKGROUND OF THE INVENTION

1. Field of the Invention

The present invention relates to a rear-projection-type display apparatus that projects an image formed by a small-sized display element on a large screen.

2. Description of the Related Art

Typically, a rear-projection-type display apparatus includes a light source, an optical component that guides a light beam emitted from the light source to a small-sized display element that forms an image, an optical engine that includes the small-sized display element and a projection lens that magnifies and projects the image, a large reflecting mirror that changes a direction of the light beam output from the projection lens, and a screen on which the light beam from the reflecting mirror is projected. These principal components are encased and held in place in a casing of the rear-projection-type display apparatus.

The dimensions of the casing of the rear-projection-type display apparatus are virtually determined by the contour of the optical engine and constraints on a beam divergence angle of the light beam output from the projection lens. Various rear-projection-type display apparatuses have been proposed for a low profile design under such constraints. For example, a rear-projection-type display apparatus disclosed in Japanese Patent Application Laid-open No. 2006-292901 includes a projection lens including a plurality of refractive lenses each having a rotationally symmetrical surface geometry and a set of two lenses each having at least one free-form rotationally asymmetrical surface, an optical system that includes at least one reflecting mirror having a free-form rotationally asymmetrical reflecting surface, and a plane reflecting mirror that reflects a light beam from the optical system to a screen.

However, in the rear-projection-type display apparatus disclosed in Japanese Patent Application Laid-open No. 2006-292901, the projection lens is constructed of two lens groups. Therefore, the entire optical system becomes bulky and complicated, and the manufacturing cost increases. Furthermore, a rotationally asymmetrical reflecting surface is difficult to produce thereby leading to cost increase.

SUMMARY OF THE INVENTION

It is an object of the present invention to at least partially solve the problems in the conventional technology.

According to one aspect of the present invention, there is provided a rear-projection-type display apparatus that projects an image formed by a display element with a light beam emitted from a light source on a screen that is larger than the display element through a projection lens. The rear-projection-type display apparatus includes a reflective optical-element group that includes at least two reflecting mirrors provided between the projection lens and the screen to deflect a light from the projection lens.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. The present invention is not limited to the embodiments explained here.

Figure 1:
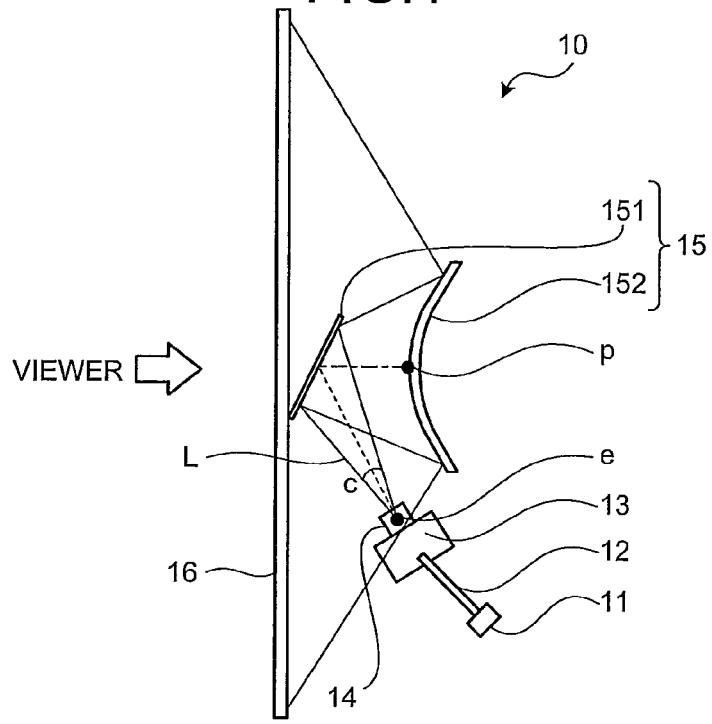
FIG. 1 is a top view of a relevant portion of a rear-projection-type display apparatus according to a first embodiment of the present invention.
Figure 2:
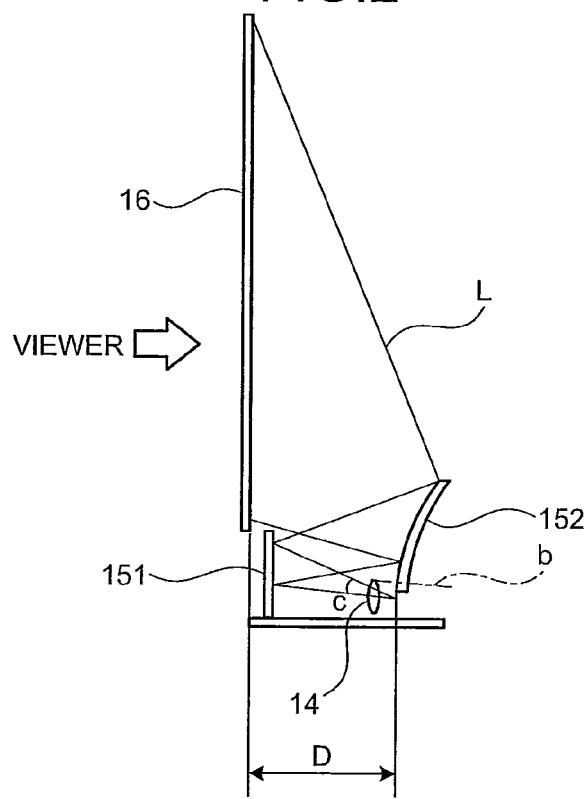
FIG. 2 is a side view of the rear-projection-type display apparatus shown in FIG. 1.

FIG. 1 is a top view of a relevant portion of a rear-projection-type display apparatus 10 according to a first embodiment of the present invention. FIG. 2 is a side view of the rear-projection-type display apparatus 10 shown in FIG. 1. The rear-projection-type display apparatus 10 includes a light source 11, an optical fiber 12, an illumination unit 13, a projection lens 14, a reflective optical-element group 15, and a screen 16. Although not shown, all the components mentioned above are supported and held in place inside a casing.

The light source 11 can be a mercury lamp, a light-emitting diode, or a semiconductor laser. In the present embodiment, the light source 11 is a laser beam source. The laser beam source includes a plurality of light source units (not shown), each corresponding to a single color, such as red, green, and blue. Each light source unit includes a light emitting unit (not shown) that emits a laser beam of a designated color, and a coupling optical system that converges the light beam emitted from the light emitting unit. An input facet of the optical fiber 12 is arranged at an optical spot of the coupling optical system for efficient transmission of optical energy.

The optical fiber 12 is formed by bundling a plurality of optical fibers provided corresponding to respective light source units to make a bundle fiber with a single output facet connected to the illumination unit 13. The optical fiber 12 thus forms a laser transmission optical path through which the laser beam from the light source 11 is propagated to the illumination unit 13.

The illumination unit 13 is arranged immediately after the output facet of the optical fiber 12, and includes an optical element (for example, a glass pipe in the shape of a quadrangular prism) that equalizes light intensity of the laser beam from the light source 11, a lens that converges the intensity-equalized light beam, and a display element that forms an image by using the light beam that is output from the lens. The display element can be a digital micro-mirror device (DMD) or a liquid crystal display element. The display element is formed in a smaller size than the screen 16. The projection lens 14 magnifies the laser beam that is output from the display element of the illumination unit 13 before the laser beam is led to the reflective optical-element group 15.

The reflective optical-element group 15 is arranged to increase the length of an optical path L between the projection lens 14 and the screen 16, and includes a plane reflecting mirror 151 and a rotationally symmetrical aspherical reflecting mirror 152. The plane reflecting mirror 151 and the rotationally symmetrical aspherical reflecting mirror 152 are arranged in order from the side of the projection lens 14 in the optical path L. The aspherical reflecting mirror 152 magnifies the light beam input thereto from the plane reflecting mirror 151 before it is projected on the screen 16. As shown in FIG. 2, an optical axis b of the aspherical reflecting mirror 152 is eccentric to an optical axis of the entire rear-projection-type display apparatus 10. The aspherical reflecting mirror 152 projects the light beam from the plane reflecting mirror 151 on the entire screen 16 in an area above the optical axis b. As compared with an optical system configured by using an area that includes the optical axis b, the dimension of the rear-projection-type display apparatus 10 in a height direction can be reduced by configuring the optical system by using the area out of the optical axis b of the aspherical reflecting mirror 152. The rotationally symmetrical aspherical reflecting mirror 152 can be one that is by itself rotationally symmetrical, or one formed by cutting a portion of an aspherical reflecting mirror that is rotationally symmetrical.

Thus, in the first embodiment, two reflective optical elements are included in the optical path L to reflect the light beam back and forth to increase the length of the optical path L between the projection lens 14 and the screen 16. Unlike the conventional apparatus in which no optical element is provided between the projection lens and the plane reflecting mirror arranged before the screen, in the rear-projection-type display apparatus 10, the plane reflecting mirror 151 is provided between the projection lens 14 and the aspherical reflecting mirror 152 arranged before the screen 16. Thus, the distance between the projection lens 14 and the aspherical reflecting mirror 152 can be increased compared with the distance between the corresponding optical components in the conventional apparatus. As a result, compared with the conventional apparatus, a reduced beam divergence angle c of the light beam from the projection lens 14 that projects the light beam on substantially the entire surface of the aspherical reflecting mirror 152 can be achieved. Furthermore, the light beam from the projection lens 14 is reflected back and forth by providing the plane reflecting mirror 151 between the projection lens 14 and the aspherical reflecting mirror 152, so that the dimension of the rear-projection-type display apparatus 10 in the depth direction can be reduced while increasing the distance between the projection lens 14 and the aspherical reflecting mirror 152. Thus, the dimensions of the casing of the rear-projection-type display apparatus 10, i.e., both the depth and the height dimensions of the rear-projection-type display apparatus 10, can be reduced. Furthermore, because both the plane reflecting mirror 151 and the rotationally symmetrical aspherical reflecting mirror 152 that form the reflective optical-element group 15 are easy to produce, the cost can be reduced.

In the rear-projection-type display apparatus 10 configured as described above, the laser beam emitted from the light source 11 propagates through the optical fiber 12 that serves as the laser transmission optical path, passes through the lens of the illumination unit 13, and is irradiated to the small-sized display element to form an image thereon. Thereafter, the light beam reflected by the small-sized display element passes through the projection lens 14 and propagates towards the plane reflecting mirror 151, and is reflected by the plane reflecting mirror 151 to the aspherical reflecting mirror 152. According to its shape, the aspherical reflecting mirror 152 widens a reflection angle of the light beam, and projects the image on substantially the entire surface of the screen 16. Thus, the image is displayed on the screen 16.

In the first embodiment, two reflective optical elements that serve as the reflective optical-element group 15 are arranged between the projection lens 14 and the screen 16. It is only essential that at least two reflective optical elements are arranged between the projection lens 14 and the screen 16. Furthermore, in the first embodiment, the plane reflecting mirror 151 and the aspherical reflecting mirror 152 are arranged in order from the side of the projection lens 14 as the reflective optical-element group 15; however, the arrangement order of the plane reflecting mirror 151 and the aspherical reflecting mirror 152 can be reversed.

According to the first embodiment, the beam divergence angle c of the light beam from the projection lens 14 can be reduced by placing at least two reflective optical elements between the projection lens 14 and the screen 16. Consequently, the optical components can be arranged in less space and the light beam can be prevented from being blocked by the surrounding structure. Thus, contour dimensions of the rear-projection-type display apparatus 10 can be reduced.

In a second embodiment of the present invention, the preferred order of the reflective optical elements forming the reflective optical-element group 15 from the projection lens 14 is first the plane reflecting mirror 151 followed by the aspherical reflecting mirror 152. In other words, the aspherical reflecting mirror 152 is preferably arranged as close to the screen 16 as possible. This is because a light beam diameter in the optical path between the projection lens 14 and the aspherical reflecting mirror 152 becomes smaller as the aspherical reflecting mirror 152 is arranged farther away from the projection lens 14.

Furthermore, according to its shape, the aspherical reflecting mirror 152 can abruptly change the divergence angle of the input light ray. Therefore, an image can be projected to the screen 16 to substantially cover the entire screen 16 by selecting the aspherical reflecting mirror 152 of a suitable shape.

According to the second embodiment, the dimensions of the rear-projection-type display apparatus 10 can be reduced in the depth and height directions by arranging the plane reflecting mirror 151 first followed by the aspherical reflecting mirror 152 after the projection lens 14. Furthermore, the interference between the light beam reflected by the aspherical reflecting mirror 152 and the light beam from the optical elements that form the optical system can be prevented, and the optical components can be made compact.

Furthermore, by placing the aspherical reflecting mirror 152 just before the screen 16, the need for using a large reflecting mirror to suit the size of the screen 16, as is the case in the conventional rear-projection-type display apparatus, can be eliminated. Moreover, the plane reflecting mirror 151 arranged before the aspherical reflecting mirror 152 need not be large in size. As a result, the dimension of the rear-projection-type display apparatus 10 in the depth direction can be reduced.

In a third embodiment of the present invention, the distance from an exit pupil of the projection lens 14 to a vertex p of the aspherical reflecting mirror 152 on the optical axis is preferably longer than a distance D from the vertex p to an input surface of the screen 16 in a direction normal to the screen 16, more preferably twice as long as the distance D. Thus, the divergence angle of the light beam diameter from the projection lens 14 can be reduced.

In the rear-projection-type display apparatus 10 according to the third embodiment also, the dimension of the rear-projection-type display apparatus 10 in the depth direction can be reduced.

Figure 3A:
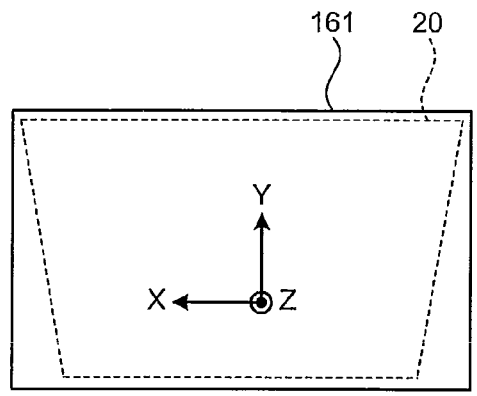
FIG. 3A is a schematic diagram of how a projected image appears relative to a screen frame according to a fourth embodiment of the present invention.
Figure 3B:
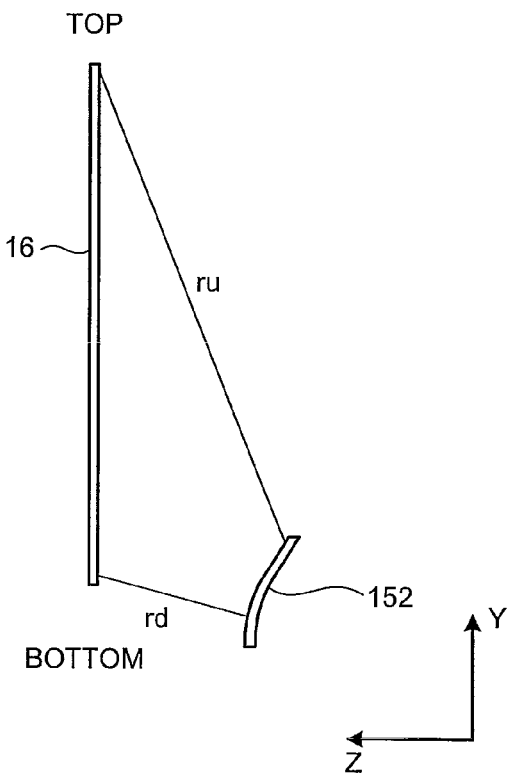
FIG. 3B is a schematic diagram of a positional relation between a screen and an aspherical reflecting mirror.
Figure 3C:
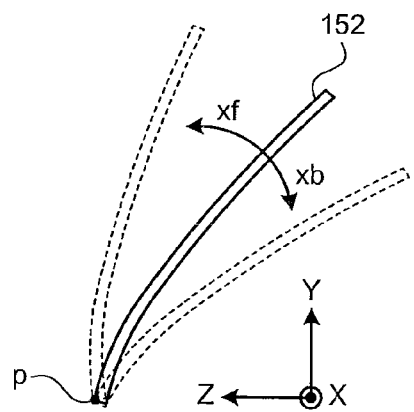
FIG. 3C is a schematic diagram for explaining correction of a position of the aspherical reflecting mirror.

FIG. 3A is a schematic diagram of how a projected image 20 appears relative to a screen frame 161 according to a fourth embodiment of the present invention. FIG. 3B is a schematic diagram of a positional relation between the screen 16 and the aspherical reflecting mirror 152. FIG. 3C is a schematic diagram for explaining correction of the position of the aspherical reflecting mirror 152. In FIGS. 3A to 3C, Y-axis represents a vertical direction, X-axis represents a direction perpendicular to the Y axis within a plane of the screen 16, and Z-axis represents a direction perpendicular to both the X-axis and the Y-axis.

In FIG. 3A, which is a schematic diagram of the projected image 20 on the screen 16 as viewed by a viewer, the projected image 20 appears distorted in the vertical direction of the paper surface (that is, in the Y-axis direction) relative to the screen frame 161. The distortion is due to variations in the arrangement of the reflective optical elements arranged after the projection lens 14. Such distortion can be corrected by changing the distances of a top-edge light ray ru that is thrown from the top of the aspherical reflecting mirror 152 to the top of the screen 16, and a bottom-edge light ray rd that is thrown from the bottom of the aspherical reflecting mirror 152 to the bottom of the screen 16 shown in FIG. 3B.

FIG. 3C is a schematic diagram of a correction method of the distortion shown in FIG. 3A. To correct the distortion, a rotating mechanism (not shown) provided at the vertex p of the reflecting surface of the aspherical reflecting mirror 152 rotates the aspherical reflecting mirror 152 about the X-axis (in the direction perpendicular to the paper surface), so that the position of the reflecting surface of the aspherical reflecting mirror 152 can be moved within the Y-Z plane about the vertex p (X-axis). For example, by moving (rotating) the aspherical reflecting mirror 152 in an xf direction shown in FIG. 3C, the distance of the top-edge light ray ru can be decreased as compared with before correction, and the length of the projected image 20 at the top of the screen 16 can be decreased in the X-axis direction. In this way, the distortion as shown in FIG. 3A in which the length of the projected image 20 at the top of the screen 16 is longer than at the bottom of the screen 16 in the X-axis direction can be corrected. On the other hand, by moving (rotating) the aspherical reflecting mirror 152 in an xb direction shown in FIG. 3C, the length of the bottom-edge light ray rd can be increased compared with before correction, and the length of the projected image 20 at the top of the screen 16 can be increased in the X-axis direction. In this way, the distortion in which the length of the projected image 20 at the top of the screen 16 is shorter than at the bottom of the screen 16 in the X-axis direction can be corrected.

Figure 4A:
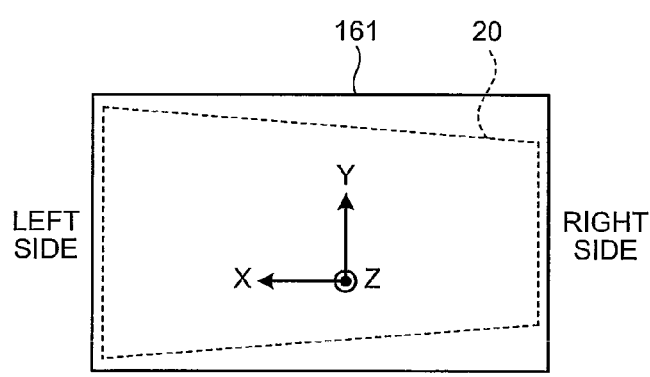
FIG. 4A is a schematic diagram of how the projected image appears relative to the screen frame according to the fourth embodiment of the present invention.
Figure 4B:
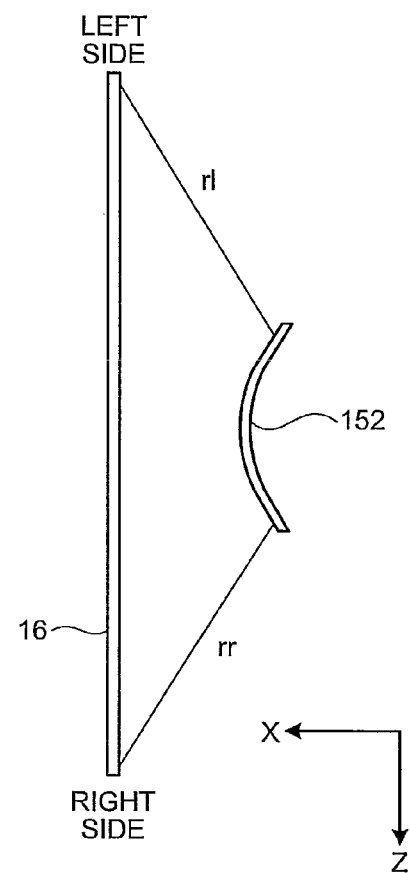
FIG. 4B is a schematic diagram of the positional relation between the screen and the aspherical reflecting mirror.
Figure 4C:
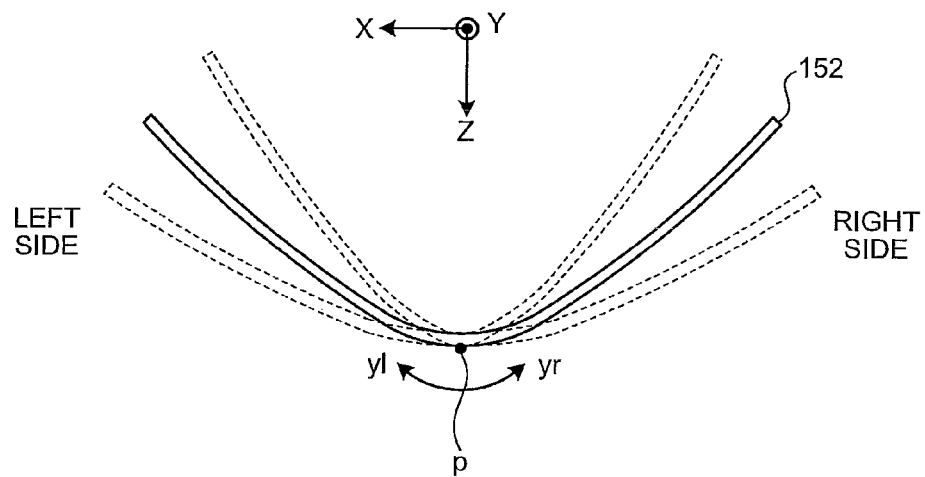
FIG. 4C is a schematic diagram for explaining correction of the position of the aspherical reflecting mirror.

FIG. 4A is a schematic diagram of how the projected image 20 appears relative to the screen frame 161 according to the fourth embodiment of the present invention. FIG. 4B is a schematic diagram of the positional relation between the screen 16 and the aspherical reflecting mirror 152. FIG. 4C is a schematic diagram for explaining correction of the position of the aspherical reflecting mirror 152. In FIGS. 4A to 4C, Y-axis represents a vertical direction, X-axis represents a direction perpendicular to the Y axis within the plane of the screen 16, and Z-axis represents a direction perpendicular to both the X-axis and the Y-axis.

In FIG. 4A, which is a schematic diagram of the projected image 20 on the screen 16 as viewed by the viewer, the projected image 20 appears distorted in the horizontal direction of the paper surface (that is, in the X-axis direction) relative to the screen frame 161. The reason for the distortion is the same as the reason for the distortion in the Y-axis direction. Such distortion can be corrected by changing the distances of a left-edge light ray rl that is thrown from the left edge of the aspherical reflecting mirror 152 to the left edge of the screen 16, and a right-edge light ray rr that is thrown from the right edge of the aspherical reflecting mirror 152 to the right edge of the screen 16 shown in FIG. 4B.

FIG. 4C is a schematic diagram of a correction method of the distortion shown in FIG. 4A. To correct the distortion, the rotating mechanism (not shown) provided at the vertex p of the reflecting surface of the aspherical reflecting mirror 152 rotates the aspherical reflecting mirror 152 about the Y-axis (in the direction perpendicular to the paper surface), so that the position of the reflecting surface of the aspherical reflecting mirror 152 can be moved within the Z-X plane about the vertex p (Y-axis).

For example, by moving (rotating) the aspherical reflecting mirror 152 in a yr direction shown in FIG. 4C, the distance of the left-edge light ray rl can be decreased and the length of the right-edge light ray rr can be increased as compared with before correction. As a result, the length of the left edge of the projected image 20 on the screen 16 can be decreased in the Y-axis direction, and the length of the right edge of the projected image 20 on the screen 16 can be increased in the Y-axis direction. In this way, the distortion as shown in FIG. 4A in which the length of the projected image 20 in the Y-axis direction on the left edge of the screen 16 is longer than on the right edge of the screen 16 can be corrected.

On the other hand, by moving (rotating) the aspherical reflecting mirror 152 in a yl direction shown in FIG. 3C, the distance of the left-edge light ray rl can be increased and the length of the right-edge light ray rr can be decreased as compared with before correction. As a result, the length of the left edge of the projected image 20 on the screen 16 can be increased in the Y-axis direction, and the length of the right edge of the projected image 20 on the screen 16 can be decreased in the Y-axis direction. In this way, the distortion in which the length of the projected image 20 on the right edge of the screen 16 is longer than on the left edge of the screen 16 in the Y-axis direction can be corrected.

Complicated image distortion can be corrected by a combination of rotation adjustments of the aspherical reflecting mirror 152 about the X-axis and the Y-axis by the rotating mechanism.

Thus, according to the fourth embodiment of the present invention, by providing a rotating mechanism that can rotate the aspherical reflecting mirror 152 in either the X-axis direction or the Y-axis direction or both, asymmetrical distortion in either the vertical direction or the horizontal direction or both directions arising in the image due to variations in the arrangement of the reflective optical components arranged after the projection lens 14 can be corrected. Thus, an image with less distortion can be displayed.

According to one aspect of the present invention, the entire optical system can be arranged in a small area, enabling reduction of apparatus dimensions in a depth direction and a height direction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A rear-projection-type display apparatus that projects an image formed by a display element with a light beam emitted from a light source on a screen that is larger than the display element through a projection lens, the rear-projection-type display apparatus comprising:

a reflective optical-element group that includes at least two reflecting mirrors provided between the projection lens and the screen to deflect a light from the projection lens wherein the at least two reflecting mirrors include a plane reflecting mirror that deflects the light on an optical path between the projection lens and the screen, and an aspherical reflecting mirror that magnifies the image projected from the projection lens on the optical path, further comprising a rotating unit that rotates a reflecting surface of the aspherical reflecting mirror about an axis that passes through a vertex of the reflecting surface and is parallel to a side of the screen that is rectangular.

2. The rear-projection-type display apparatus according to claim 1, wherein, the plane reflecting mirror and the aspherical reflecting mirror are arranged in order from the projection lens side.

3. The rear-projection-type display apparatus according to claim 2, wherein a distance on the optical path between the projection lens and the aspherical reflecting mirror is longer than a distance from the aspherical reflecting mirror to the screen in a direction normal to the screen.

4. The rear-projection-type display apparatus according to claim 2, wherein the aspherical reflecting mirror reflects a light from the plane reflecting mirror to the screen in an area out of an optical axis of the aspherical reflecting mirror.

5. A rear-projection-type display apparatus that projects an image formed by a display element with a light beam emitted from a light source on a screen that is larger than the display element through a projection lens, the rear-projection-type display apparatus comprising:

a reflective optical-element group that includes at least two reflecting mirrors provided between the projection lens and the screen to deflect a light from the projection lens, wherein the at least two reflecting mirrors include a plane reflecting mirror that deflects the light on an optical path between the projection lens and the screen, and an aspherical reflecting mirror that magnifies the image projected from the projection lens on the optical path, wherein the aspherical reflecting mirror is formed by cutting a rotationally symmetrical aspherical reflecting mirror.

* * * * *